United States Patent

[11] 3,633,627

| [72] | Inventors | Charles H. Perrott<br>Portland, Oreg.;<br>James B. Watts, Overgaard, Ariz. |
|---|---|---|
| [21] | Appl. No. | 6,776 |
| [22] | Filed | Jan. 29, 1970 |
| [45] | Patented | Jan. 11, 1972 |
| [73] | Assignee | Precision Plumbing Products, Inc. |

[54] FLUID HAMMER ARRESTER
3 Claims, 5 Drawing Figs.

[52] U.S. Cl................................................. 138/31,
92/85, 267/124
[51] Int. Cl................................................. F16l55/01
[50] Field of Search........................................ 138/26, 27,
28, 30, 31; 267/118, 124; 92/85; 222/386–393

[56] References Cited
UNITED STATES PATENTS

| 2,780,504 | 2/1957 | Russell | 138/31 |
| 3,047,023 | 7/1962 | Dick | 138/31 |
| 3,173,447 | 3/1965 | Lebow | 138/31 |
| 3,198,213 | 8/1965 | Schindel | 138/31 |
| 3,512,454 | 5/1970 | Perkins | 92/85 |

*Primary Examiner*—Houston S. Bell, Jr.
*Attorney*—Eugene D. Farley

ABSTRACT: An arrester for inhibiting hammer caused by interruption of fluid flow in conduits comprises a hollow cylindrical body closed at one end and open at the other. A piston is freely slidable within the body forming with the closed end thereof an hermetically sealed gas chamber. A connector connects the open end of the body with the conduit conveying fluid under pressure. Under fluid hammer conditions, the piston is advanced against the gas in the gas chamber. This forms a cushion which absorbs the shock and prevents the development of fluid hammer.

PATENTED JAN 11 1972
3,633,627
FIG. 4
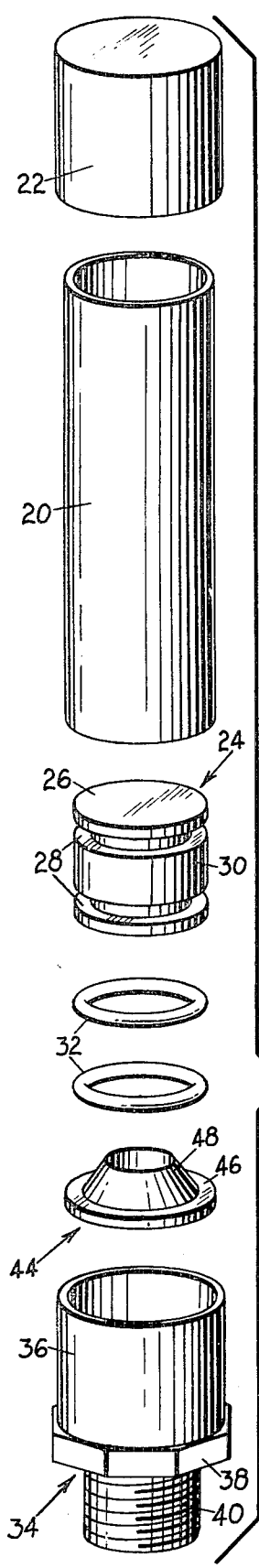
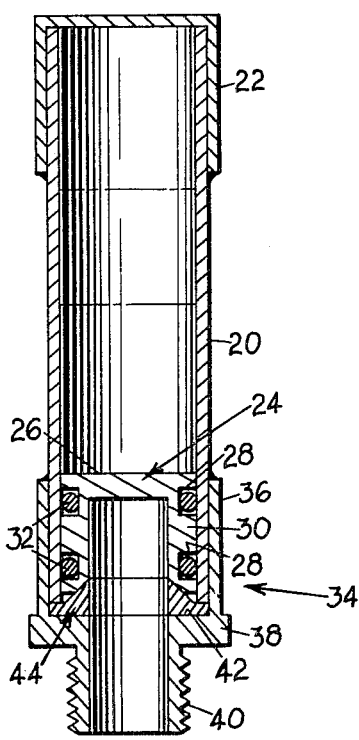
FIG. 3
FIG. 2
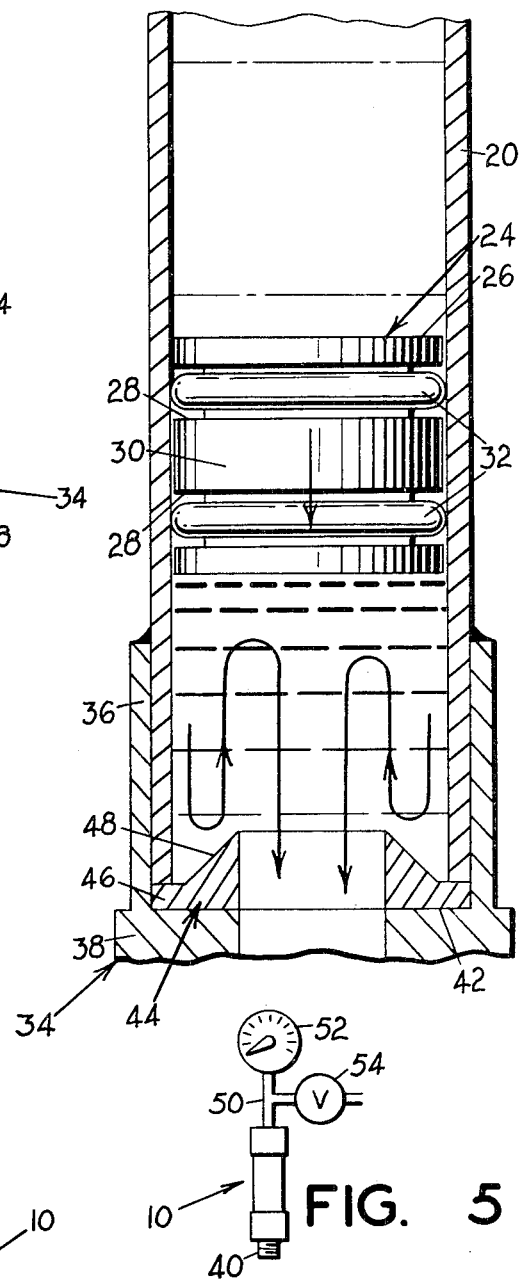
FIG. 1
FIG. 5
CHARLES H. PERROTT
JAMES B. WATTS
INVENTORS.
BY Eugene D. Farley
ATTY.

FLUID HAMMER ARRESTER

This invention pertains to devices for preventing the development of fluid hammer in conduits conveying fluid under conditions of interrupted fluid flow.

The familiar phenomenon of fluid hammer is caused by the development of hydraulic shock waves generated by the sudden stopping of fluid flow within the confines of a conduit system carrying fluid under pressure. This condition results from the rapid closing of positive valves incorporated within the system. In addition to the production of unpleasant noise effects, fluid hammer if allowed to persist for any length of time will result in broken conduits and damage to other components of the conduit system.

Various types of fluid hammer arresters are known to the prior art. The most commonly employed of such arresters include expandable bellows or diaphragms which absorb the shock. These are so subject to failure that their service life is very short.

Another type of fluid hammer arrester involves the application of a piston working against the pressure developed by a compressed gas chamber. The prior art devices of this class, however, are subject to leakage with the result that they waterlog after a period of a few months. It then is necessary to drain the entire conduit system in order to recharge the arresters.

It is the general object of the present invention to provide a fluid hammer arrester which is highly effective in overcoming the problem of fluid hammer, which may be applied to systems handling various types of fluids including combustible fluids derived from petroleum, which is readily incorporated in conventional piping arrangements, which does not leak nor wear and accordingly has a long service life, and which is substantially maintenance free.

In the drawings:

FIG. 1 is a fragmentary view in side elevation of a piping system including the herein described fluid hammer arrester;

FIG. 2 is an exploded top perspective view of the arrester;

FIG. 3 is a longitudinal sectional view of the arrester in its assembled condition;

FIG. 4 is an enlarged fragmentary longitudinal sectional view similar to FIG. 3, but illustrating the manner of operation of the arrester; and FIG. 5 is a view in elevation of a modified form of the arrester useful in conduit systems employed for conveying inflammable fluids.

As shown in FIG. 1, the presently described fluid hammer arrester, indicated generally at 10, is adaptable for installation in fluid conveying systems wherever there is a likelihood of the development of fluid hammer. Such a situation is present in the illustrated example where there is fluid flow through a conduit system 12 including a valve 14. As is well known, closing the valve suddenly and thus arresting the flow of fluid through the conduit system may result in setting up fluid hammer conditions.

In general, the fluid hammer arrester should be placed as near to the source of shock as possible. It also should be installed in such a manner that there is an unobstructed shock path to the arrester.

Thus, in the illustration of FIG. 1, the arrester may be included in the conduit system simply by inserting a T 16 to which the arrester 10 is coupled.

The construction of the arrester and its manner of operation are shown in detail in FIGS. 2, 3 and 4.

The arrester includes a hollow cylindrical body 20 which is closed at one end, as by means of a cap 22. Both the body and cap may be made of brass or other suitable materials. The cap is sealed across the open end of the body by being soldered thereto, or by other methods insuring a tight seal.

A piston 24 is freely slidable within the cylindrical body. It includes a head 26, annular grooves 28 and an intervening land 30. Sealing rings 32 made of natural or artificial rubber, plastic or other suitable materials are seated in grooves 28.

A connector 34 by means of which the arrester is coupled to the fluid conducting system is mounted on the open end of cylinder 20.

The connector preferably has a cylindrical body or cap 36 which fits over the open end of cylindrical body 20 and is sealed thereto as by means of soldering. An integral nut 38 is present on the connector to facilitate its application to the piping components of the system.

A threaded nipple 40 of reduced diameter extends outwardly from the connector for threaded engagement with T 16 or other pipe connection. It is to be noted that the diameter of nipple 40 approximates that of the piping in conduit system 12, whereas the diameter of cylinder 20 is substantially enlarged. This greatly assists in the absorption of the shock waves and prevention of fluid hammer.

The restricted diameter noted above results in the provision of an annular shoulder 42 which limits the retracting movement of the piston and upon which is supported baffle means 44 designed to direct the flow of fluid in the arrester.

The baffle means includes a peripheral base 46, which seats on shoulder 42, and a frustoconical baffle member 48 which extends inwardly toward the center of the arrester. The upper surface of base 46 provides a seat for receiving the margin of cylindrical body 20. Body 20, connector 34, and baffle 44 thus may be integrated into a unitary sealed structure by soldering, brazing or welding techniques as shown particularly in FIG. 4.

In the installation of the arrester, it simply is screwed tightly into T 16 in the manner shown in FIG. 1. Air initially is present on both sides of piston 24. Where conduit 12 conveys water, or noncombustible fluid, the air in front of the piston remains trapped and provides a compressed air cushion. The air behind the piston gradually works out into the system so that the fluid ultimately contacts the back face of the piston.

Under fluid hammer conditions, the shock waves are transmitted to the piston which, being freely slidable, advances and retracts within cylindrical body 20. During the advancing motion of the piston, the air ahead of it is compressed. During its retracting motion, the air expands and the fluid is displaced reversely back into the conduit. During its reverse displacement, the fluid is intercepted by baffle 44 which returns part of it in the direction of the piston as indicated by the arrows of FIG. 4. This slows down the return motion of the piston and eliminates "shock echo."

Where combustible fluids are conveyed in the conduit system, the adaptation illustrated in FIG. 5 may be employed.

In this adaptation, cap 22 of the arrester is fitted with a T-shaped tube 50. One end of the tube communicates with the interior of the arrester. The opposite end is fitted with a pressure gauge 52. The third end of the tube is fitted to a valve 54. This valve may be of the type used in heavy duty truck tires for controlling pneumatic pressure.

The adaptation above described permits filling the space in front of piston 24 with an inert gas such as nitrogen. This reduces the fire hazard and enables the use of the system with combustible fluids such as cleaners naphtha, gasoline and other petroleum products.

To install the adaptation of FIG. 5, it is merely necessary to attach the arrester to the system containing fluid under pressure, open valve 54, and permit piston 24 to advance to the end of the adapter under the pressure of the system. This removes all of the air.

With valve 54 still open, a source of nitrogen under pressure is coupled to the end of the T and the system purged with nitrogen. Valve 54 is closed and nitrogen is introduced in predetermined amount into the interior of the arrester. It fills the chamber in front of the piston and forms the gas cushion required for operation of the arrester. The adapter is then ready for use.

Having thus described our invention in preferred embodiments, we claim:

1. A hammer arrester comprising
   a. a hollow cylindrical body closed at one end and open at the other,
   b. a piston freely slidable within the body and forming in the closed end thereof a hermetically sealed gas chamber,
   c. a hollow cylindrical connector open at both ends and secured to the body at the open end thereof, the connector being provided with means for connection to a conduit conveying fluid under pressure, thereby placing the body in open communication with the conduit and the fluid contained in the conduit in pressure contact with the piston, whereby to reciprocate the piston with fluctuation in fluid pressure between advanced and retracted positions, and d. a hollow, frustoconical baffle member in the body between the piston and connector having a central bore communicating the connector with the interior of the body, the outer surface of the baffle member flaring outward in the direction away from the piston, whereby to deflect fluid toward the piston as the latter moves toward the baffle member, thereby damping said piston movement.

2. The fluid hammer arrester of claim 1 wherein the end of the piston facing the baffle member has a central frustoconical recess and the frustoconical baffle member is dimensioned to enter said recess.

3. The fluid hammer arrester of claim 1 including valved conduit means communicating with the gas chamber for use in filling the same with an inert compressible gas.

* * * * *